US011906122B2

(12) United States Patent
Maier et al.

(10) Patent No.: US 11,906,122 B2
(45) Date of Patent: Feb. 20, 2024

(54) ILLUMINATION DEVICE FOR A MOTOR VEHICLE HEADLIGHT

(71) Applicant: ZKW Group GmbH, Wieselburg (AT)

(72) Inventors: Christian Maier, Oberndorf an der Melk (AT); Martin Schragl, Zarnsdorf (AT)

(73) Assignee: ZKW Group GmbH, Wieselburg (AT)

( * ) Notice: Subject to any disclaimer, the term of this patent is extended or adjusted under 35 U.S.C. 154(b) by 106 days.

(21) Appl. No.: 17/632,303

(22) PCT Filed: Jul. 8, 2020

(86) PCT No.: PCT/EP2020/069248

§ 371 (c)(1),
(2) Date: Feb. 2, 2022

(87) PCT Pub. No.: WO2021/028124

PCT Pub. Date: Feb. 18, 2021

(65) Prior Publication Data

US 2022/0290830 A1 Sep. 15, 2022

(30) Foreign Application Priority Data

Aug. 14, 2019 (EP) .................................... 19191724

(51) Int. Cl.
*F21S 41/24* (2018.01)
*F21S 41/43* (2018.01)
(Continued)

(52) U.S. Cl.
CPC ............. *F21S 41/24* (2018.01); *F21S 41/148* (2018.01); *F21S 41/285* (2018.01); *F21S 41/322* (2018.01); *F21S 41/435* (2018.01)

(58) Field of Classification Search
CPC ........ F21S 41/24; F21S 41/435; F21S 41/322; F21S 41/148; F21S 41/285; F21S 43/249
See application file for complete search history.

(56) References Cited

U.S. PATENT DOCUMENTS 9,689,550 B2 * 6/2017 Tai ........................ F21S 43/315
10,480,743 B2 * 11/2019 Gao ...................... F21S 43/239
(Continued)

FOREIGN PATENT DOCUMENTS

CN 107037524 A 8/2017
DE 102015204747 A1 9/2016
(Continued)

OTHER PUBLICATIONS

International Search Report for PCT/EP2020/069248, dated Sep. 9, 2020 (13 pages).
(Continued)

*Primary Examiner* — Matthew J. Peerce
(74) *Attorney, Agent, or Firm* — Eversheds Sutherland (US) LLP

(57) ABSTRACT

The invention relates to an illumination device (1) for a motor vehicle headlight, comprising:

a lighting means (2);

a primary optic element (3), which has a primary light input face (3*a*) for receiving light emitted by the lighting means (2), the light being guided to a primary light output face (3*b*) and emitted in a main emission direction (4);

a secondary optic element (5), which has a secondary light input face (5*a*), the light from the lighting means (2) being emitted from the primary light output face (3*b*) via the secondary light input face (5*a*) into the secondary optic element (5) and being guided inside the secondary optic element (5) to a secondary light output face (5*b*), wherein the secondary light input face (5*a*) is formed by a plurality of optical elements (6) which are arranged next to one another in a planar manner and are designed to refract the light beams as they enter the secondary optic element (5) such that the light beams (Continued)

are oriented in the direction of the main emission direction (4) after they are refracted on exiting the secondary light output face (5*b*).

17 Claims, 4 Drawing Sheets

(51) Int. Cl.

| | |
|---|---|
| ***F21S 41/32*** | (2018.01) |
| ***F21S 41/148*** | (2018.01) |
| ***F21S 41/20*** | (2018.01) |

(56) References Cited

U.S. PATENT DOCUMENTS

| | | | | |
|---|---|---|---|---|
| 10,767,827 | B2 * | 9/2020 | Zozgornik | F21V 5/008 |
| 10,859,230 | B2 * | 12/2020 | Paroni | F21S 43/14 |
| 2013/0021815 | A1 | 1/2013 | Koizumi | |
| 2018/0313505 | A1 | 10/2018 | Gao et al. | |

FOREIGN PATENT DOCUMENTS

| | | | | |
|---|---|---|---|---|
| DE | 202015008368 | U1 | 3/2017 | |
| EP | 2530372 | A1 * | 12/2012 | F21S 48/215 |
| EP | 2530372 | A1 | 12/2012 | |
| JP | 2016194983 | A * | 11/2016 | |
| JP | 2016194983 | A | 11/2016 | |

OTHER PUBLICATIONS

Search Report for European Patent Application No. 19191724.4, dated Feb. 7, 2020 (35 pages).

* cited by examiner

ILLUMINATION DEVICE FOR A MOTOR VEHICLE HEADLIGHT

The invention relates to an illumination device for a motor vehicle headlight, comprising:

- a lighting means, which is configured to generate and emit light;
- a primary optic element, which is assigned to the lighting means, the primary optic element having a primary light input face for receiving light emitted by the lighting means, the primary optic element being configured to guide the light to a primary light output face of the primary optic element and to emit it through the primary light output face in a main emission direction;
- a secondary optic element, which is arranged after the primary optic element in the light propagation direction and is spaced from the primary optic element, the secondary optic element having a secondary light input face, the secondary light input face and the primary light output face being arranged relative to each other such that the light from the lighting means is emitted from the primary light output face via the secondary light input face into the secondary optic element, the light being guided inside the secondary optic element to a secondary light output face of the secondary optic element, at least the secondary light input face and/or the secondary light output face being uneven, in particular curved, the secondary optic element having a spatial extent of at least 2 mm, preferably more than 15 mm, in the light propagation direction between the secondary light input face and the secondary light output face.

The invention further relates to a motor vehicle headlight having an illumination device.

In illumination devices for motor vehicle headlights in which light exits via a light-guiding body, undesired light refraction often occurs at the boundary face of the light-guiding body. This is problematic in particular if the light-guiding body has a large spatial extent in the light propagation direction.

The object of the present invention consists in moderating or overcoming the disadvantages of the prior art. The invention therefore aims in particular to create an illumination device in which the light emission is improved.

This object is achieved by an illumination device having the features of claim 1. Preferred embodiments are specified in the dependent claims.

According to the invention, the secondary light input face is formed by a plurality of optical elements which are arranged next to one another in a planar manner and are configured to refract the light beams as they enter the secondary optic element such that the light beams are oriented in the direction of the main emission direction after they are refracted on exiting the secondary light output face. Advantageously, the light beams are thus oriented in or parallel to the light propagation direction before and after the secondary optic element. The refraction of the light beams on entering the secondary optic element via the secondary light input face through the optical elements can thus compensate for the refraction at the secondary light output face.

Each optical element on the secondary light input face can be formed as a facet, which are arranged together preferably in a uniform grid on the secondary light input face. In this context, a facet means a geometric arrangement on the secondary light input face which is smaller than the secondary light input face, such as a face element which is tilted relative to the secondary light input face. The individual facets are preferably of the same type. The light refraction at a facet is substantially defined by the curvature of the secondary light output face or the light refraction at the secondary light output face caused thereby, since the light refraction at the facet compensates for the light refraction at the secondary light output face.

The facets can each be oriented at an angle $\gamma \neq 0°$ relative to the secondary light input face. The angle $\gamma$ is defined by the curvature or the refraction angle at the secondary light output face. The angle $\gamma$ can also be equal to zero.

The distance between the primary optic element and the secondary optic element can be 1 mm, preferably 2 mm. This results in the advantage that the optical elements on the secondary light input face cannot be damaged by possible contact with the primary light output face. In an alternative embodiment, the primary optic element and the secondary optic element can be formed as a single piece or part.

The primary light output face can have light-scattering means in order to scatter the light input by the lighting means around the main emission direction as it exits the primary light output face. This results in the advantage that the secondary light output face is illuminated with a substantially constant illumination intensity per unit area.

Preferably, the secondary optic element is in the form of a transparent solid body. The secondary optic element can be produced from plastic, for example. The secondary optic element can also be in the form of a transparent hollow body.

Preferably, the primary optic element is in the form of a transparent solid body. The primary optic element can be produced from plastic, for example. The primary optic element can also be in the form of a transparent hollow body.

The secondary light input face and the secondary light output face can be curved, there preferably being a substantially constant normal distance between the secondary light input face and the secondary light output face, starting from the secondary light output face. The curvature can therefore be realised by the secondary optic element having a sweep, the curved design allowing the undesired light refraction to occur at the secondary light output face, which light refraction is in particular compensated for by the optical elements on the secondary light input face. It is also possible for the normal distance between the secondary light input face and the secondary light output face not to be constant, in which case the secondary light input face and the secondary light output face can have a different curvature.

The primary optic element can have a single primary light input face, in which case the lighting means can comprise a light source support, preferably a printed circuit board, and a number of light sources, which can in particular be activated individually, arranged thereon, the light source support preferably being arranged on the primary light input face such that the light from the light sources is exclusively introduced into the primary optic element via the one primary light input face. This advantageously means that minimal losses occur when light is emitted into the primary optic element. The individually activatable light sources can be used to generate certain lighting patterns at the secondary light output face.

The light sources can be arranged on the light source support along a substantially annular light source path, the light source path being composed of an arrangement of the shortest distances between two adjacent light sources, the light sources in particular being distributed at uniform distances over the entire light source path.

The secondary optic element can have a cutout such that the secondary light output face has the shape of a closed path.

The light source path can reproduce the geometric shape of the closed path. This results in the advantage that the individually activatable light sources arranged along the light source path can produce lighting images or illumination functions which can be reproduced via the closed path of the secondary light output face which corresponds to the light source path.

The lighting means can be arranged relative to the primary light input face such that the light is emitted from the lighting means into the primary optic element in a direction other than the main emission direction, preferably orthogonal to the main emission direction, wherein deflection means are preferably arranged inside the primary optic element and are configured to deflect the light, after it enters the primary optic element, in the direction of the main emission direction inside the primary optic element by means of the deflection means. As a result, the size, in particular the length, of the illumination device can be reduced, which in turn reduces the necessary installation space, for example in a motor vehicle headlight.

A screen can be arranged between the primary optic element and the secondary optic element. This results in the advantage that scattered light which can be emitted laterally of the secondary light input face is blocked. As a result, the homogeneity of the light intensity emitted via the secondary light output face can be improved.

A motor vehicle headlight can be provided with an illumination device according to the invention.

In the context of the present description, the terms "top", "bottom", "horizontal" and "vertical" refer to orientation information when the illumination device is in the normal use position after it has been installed, for example in a motor vehicle headlight.

The invention is explained further below using a preferred exemplary embodiment, to which it is not intended to be limited, however. In the drawings.

Figure 1:
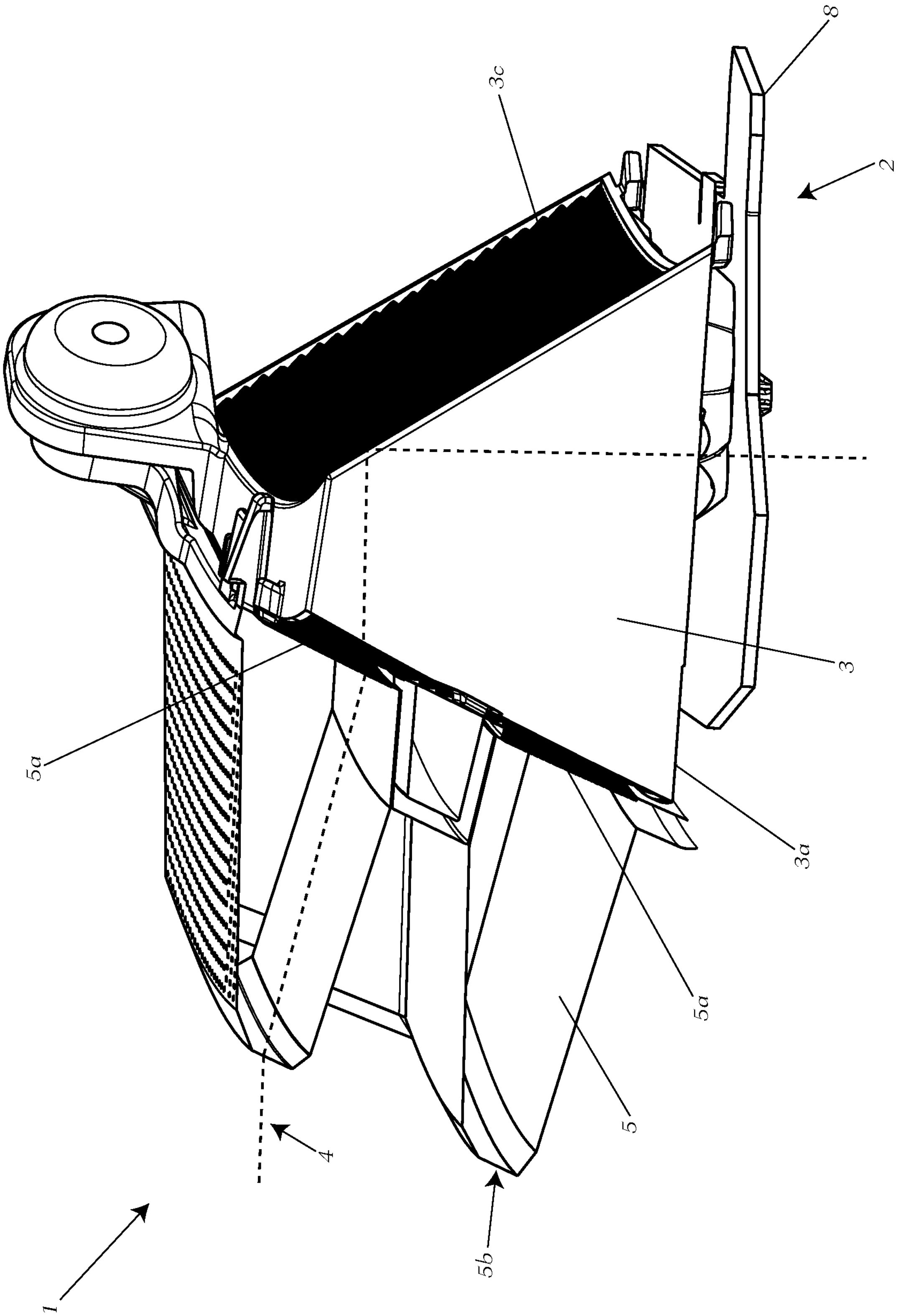
FIG. 1 shows a side view of an illumination device according to the invention.

FIG. 1 shows an illumination device 1 for a motor vehicle headlight. The illumination device 1 has a lighting means 2, which is configured to generate and emit light. A primary optic element 3 has a primary light input face 3*a* for receiving light emitted by the lighting means 2, the primary optic element 3 being configured to guide the light to a primary light output face 3*b* of the primary optic element 3 and to emit it through the primary light output face 3*b* in a main emission direction 4.

The illumination device 1 also has a secondary optic element 5, which is arranged after the primary optic element 3 in the light propagation direction and is spaced from the primary optic element 3. The distance between the primary optic element 3 and the secondary optic element 5 is 1 mm, preferably 2 mm.

The secondary optic element 5 has a secondary light input face 5*a*, the secondary light input face 5*a* and the primary light output face 3*b* being arranged relative to each other such that the light from the lighting means 2 is emitted from the primary light output face 3*b* via the secondary light input face 5*a* into the secondary optic element 5. The light is then guided inside the secondary optic element 5 to a secondary light output face 5*b* of the secondary optic element 5. The secondary light input face 5*a* and/or the secondary light output face 5*b* are uneven, in particular curved. The secondary optic element 5 has a spatial extent of at least 2 mm, preferably more than 15 mm, in the light propagation direction between the secondary light input face 5*a* and the secondary light output face 5*b*. This can be seen in particular in FIG. 6. The primary optic element 3 and the secondary optic element 5 are in the form of transparent solid bodies.

Figure 2:
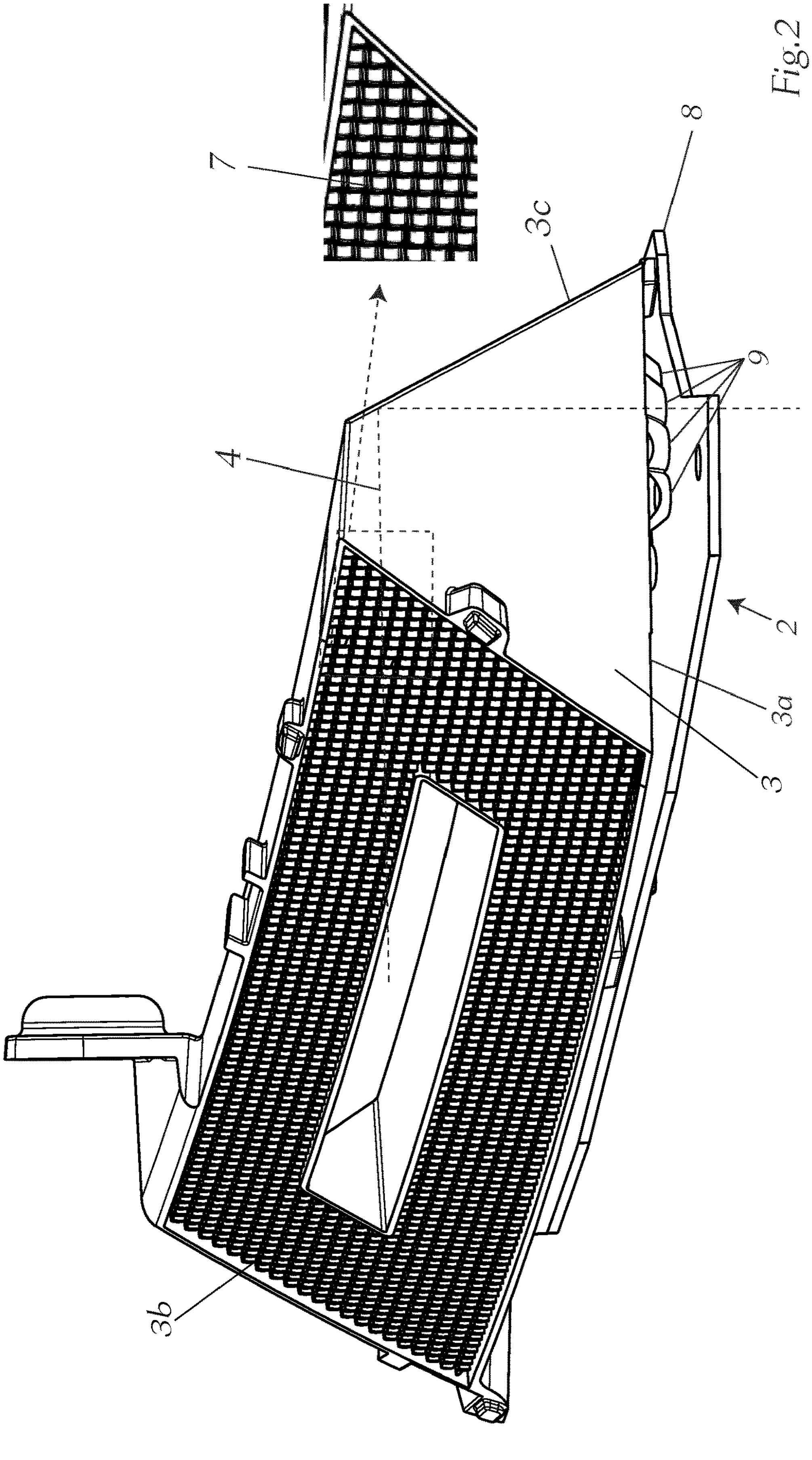
FIG. 2 shows a perspective view of a primary optic element.
Figure 4:
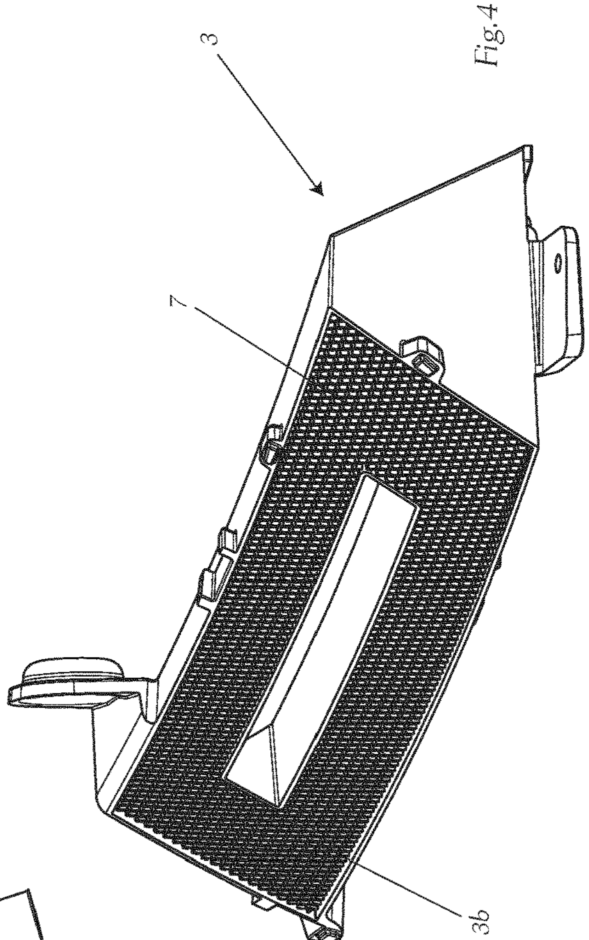
FIG. 4 shows a further view of the primary optic element.

FIGS. 2 and 4 show the primary optic element 3, in particular the primary light output face 3*b*, which has light-scattering means 7. By means of the light-scattering means 7, the light input by the lighting means 2 is scattered around the main emission direction 4 as it exits the primary light output face 3*b*. The primary optic element 3 has a single primary light input face 3*a*. The lighting means 2 comprises a light source support 8, preferably a printed circuit board, and a number of light sources 9, which can in particular be activated individually, arranged thereon. The light source support 8 is arranged on the primary light input face 3*a* such that the light from the light sources 9 is exclusively introduced into the primary optic element 3 via the one primary light input face 3*a*. The light sources 9 are arranged on the light source support 8 along a substantially annular light source path, the light source path being composed of an arrangement of the shortest distances between two adjacent light sources 9, the light sources 9 in particular being distributed at uniform distances over the entire light source path.

Figure 3:
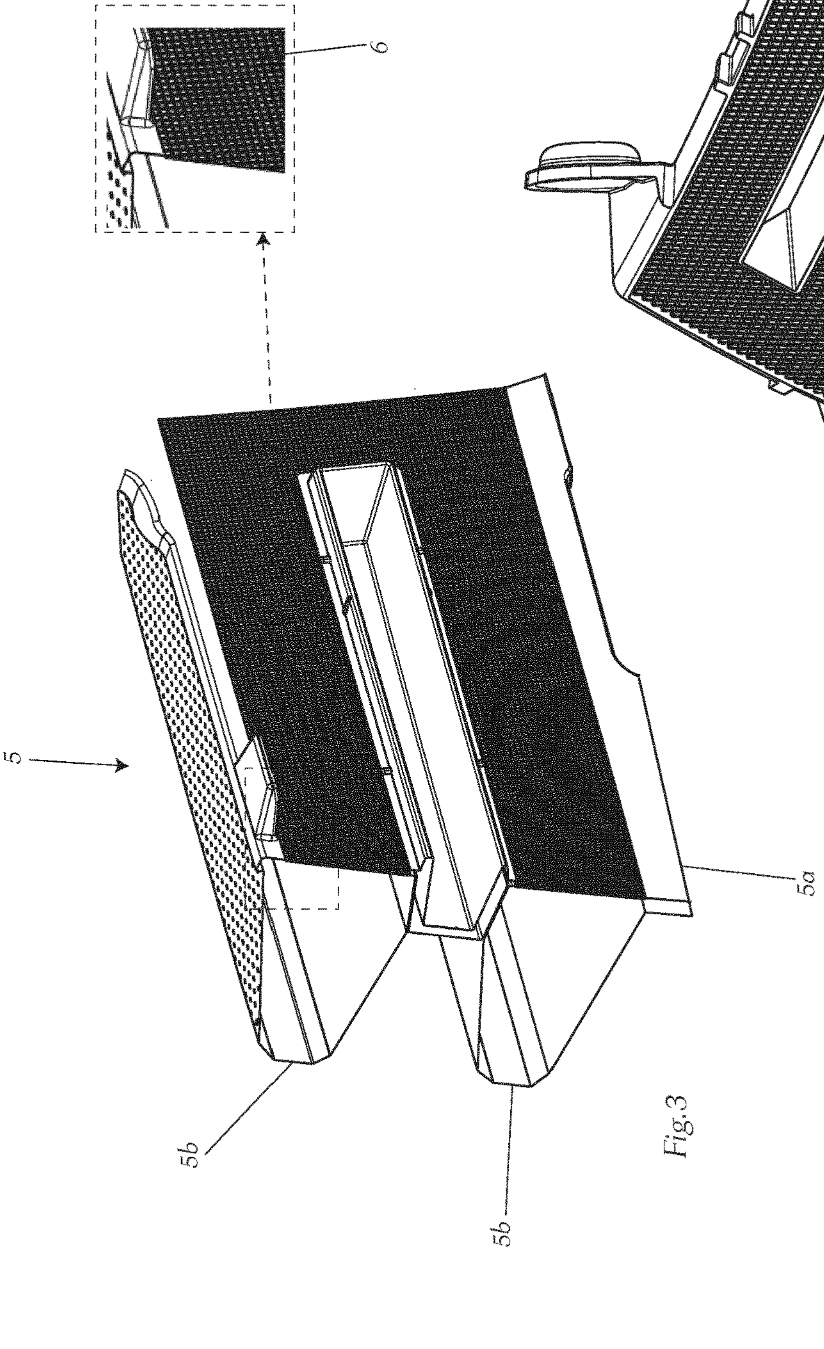
FIG. 3 shows a rear view of the secondary optic element.
Figure 6:
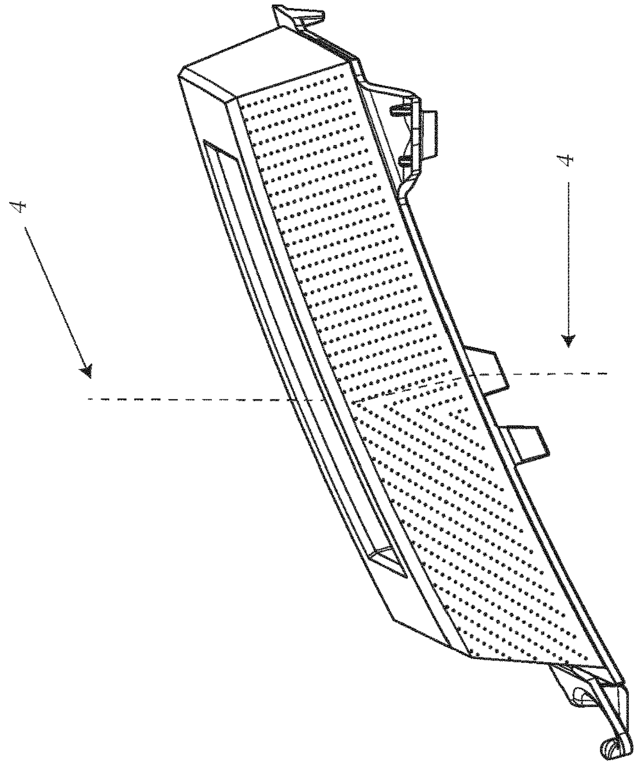
FIGS. 6 to 8 show different views of a secondary optic element.
Figure 8:
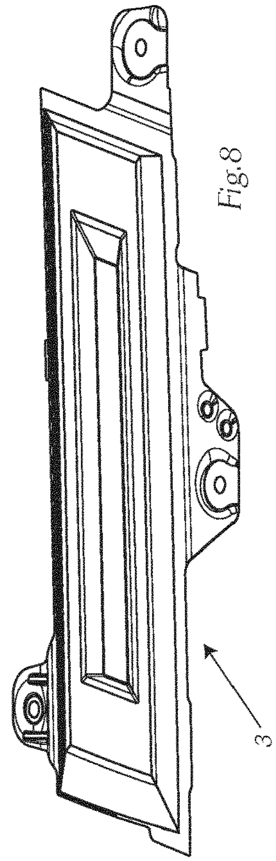

As can be seen in FIG. 3, the secondary light input face 5*a* is formed by a plurality of optical elements 6 which are arranged next to one another in a planar manner and are configured to refract the light beams as they enter the secondary optic element 5 such that the light beams are oriented in the direction of the main emission direction 4 after they are refracted on exiting the secondary light output face 5*b* (see FIG. 6). Each optical element 6 on the secondary light input face 5*a* is formed as a facet, which are arranged together in a preferably uniform grid on the secondary light input face 5*a*. The facets are each oriented at an angle $\gamma \neq 0°$ relative to the secondary light input face 5*a*.

Figure 5:
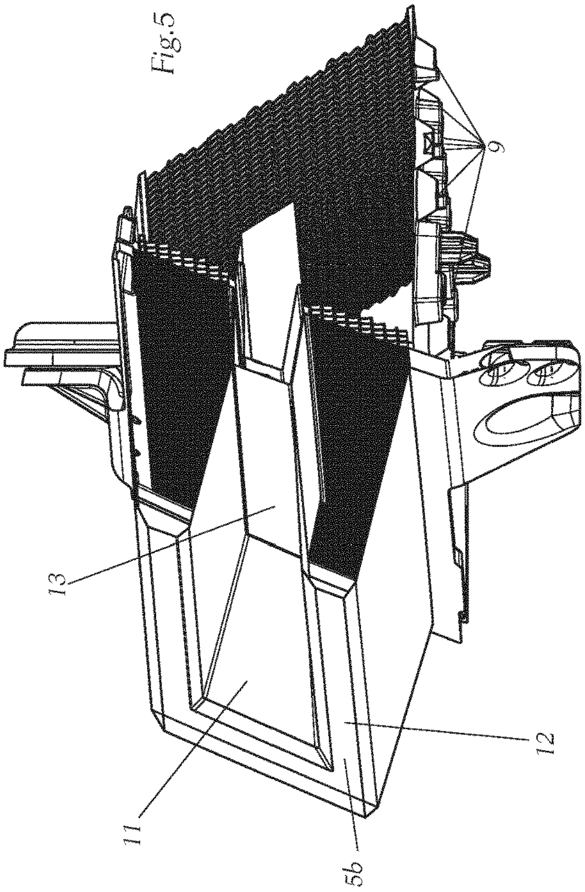
FIG. 5 shows a further view of the illumination device.
Figure 7:
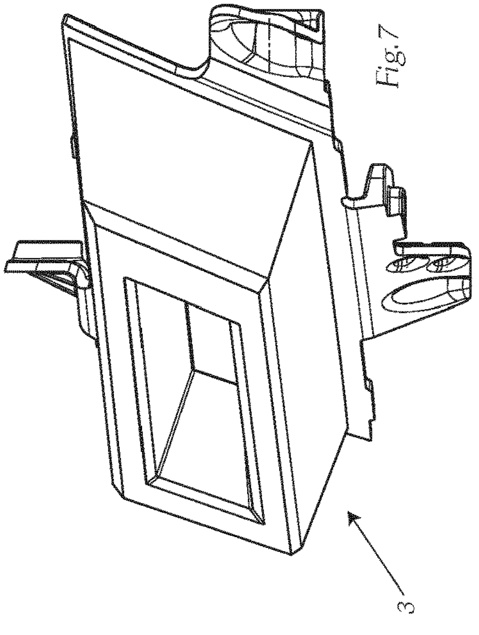

As can be seen in FIG. 5, the secondary optic element 5 has a cutout 11 such that the secondary light output face 5*b* has the shape of a closed path 12. The light source path reproduces the geometric shape of the closed path 12. In particular, a screen 13 is arranged between the primary optic element 3 and the secondary optic element 5.

As can be seen in FIG. 6, the secondary light input face 5*a* and the secondary light output face 5*b* are curved, there being a substantially constant normal distance between the secondary light input face 5*a* and the secondary light output face 5*b*, starting from the secondary light output face 5*b*.

In the embodiment according to FIG. 1, the lighting means 2 is arranged relative to the primary light input face 3*a* such that the light is emitted from the lighting means 2 into the primary optic element 3 in a direction other than the main emission direction 4, in this case orthogonal to the main emission direction 4. Deflection means 3*c* are arranged inside the primary optic element 3 and are configured to deflect the light, after it enters the primary optic element 3, in the direction of the main emission direction 4 inside the primary optic element 3 by means of the deflection means 3*c* (see FIG. 2).

In a further embodiment, the primary optic element 3 and the secondary optic element 5 can be formed as a single part.

The invention claimed is:

1. An illumination device (1) for a vehicle headlight, comprising:

a lighting means (2), which is configured to generate and emit light;

a primary optic element (3), which is assigned to the lighting means (2), the primary optic element (3) having a primary light input face (3*a*) for receiving light emitted by the lighting means (2), the primary optic element (3) being configured to guide the light to a primary light output face (3*b*) of the primary optic element (3) and to emit it through the primary light output face (3*b*) in a main emission direction (4);

a secondary optic element (5), which is arranged after the primary optic element (3) in the light propagation direction and is spaced from the primary optic element (3), the secondary optic element (5) having a secondary light input face (5*a*), the secondary light input face (5*a*) and the primary light output face (3*b*) being arranged relative to each other such that the light from the lighting means (2) is emitted from the primary light output face (3*b*) via the secondary light input face (5*a*) into the secondary optic element (5), the light being guided inside the secondary optic element (5) to a secondary light output face (5*b*) of the secondary optic element (5), at least the secondary light input face (5*a*) and/or the secondary light output face (5*b*) being curved, the secondary optic element (5) having a spatial extent of at least 2 mm in the light propagation direction between the secondary light input face (5*a*) and the secondary light output face (5*b*), wherein the secondary light input face (5*a*) is formed by a plurality of optical elements (6) which are arranged next to one another in a planar manner and are configured to refract the light beams as they enter the secondary optic element (5) such that the light beams are oriented in the direction of the main emission direction (4) after they are refracted on exiting the secondary light output face (5*b*), wherein the primary optic element (3) has a single primary light input face (3*a*), wherein the lighting means (2) comprises a light source support (8) and a number of light sources (9), which can be activated individually, arranged thereon, wherein the light source support (8) is arranged on the primary light input face (3*a*) such that the light from the light sources (9) is exclusively emitted into the primary optic element (3) via the one primary light input face (3*a*), wherein the light sources (9) are arranged on the light source support (8) along a substantially annular light source path, wherein the light source path is composed of an arrangement of the shortest distances between two adjacent light sources (9*c*), wherein the secondary optic element (5) has a cutout (11) such that the secondary light output face (5*b*) has the shape of a closed path (12), wherein the light source path reproduces the geometric shape of the closed path (12), and wherein the lighting means (2) is arranged relative to the primary light input face (3*a*) such that the light is emitted from the lighting means (2) into the primary optic element (3) in a direction other than the main emission direction (4), wherein deflection means (3*c*) are arranged inside the primary optic element (3) and are configured to deflect the light, after it enters the primary optic element (3), in the direction of the main emission direction (4) inside the primary optic element (3) by means of the deflection means (3*c*).

2. The illumination device (1) according to claim 1, wherein each optical element (6) on the secondary light input face (5*a*) is formed as a facet, which are arranged together on the secondary light input face (5*a*).

3. The illumination device (1) according to claim 2, wherein the facets are each oriented at an angle $\gamma \neq 0°$ relative to the secondary light input face (5*a*).

4. The illumination device (1) according to claim 1, wherein the distance between the primary optic element (3) and the secondary optic element (5) is 1 mm.

5. The illumination device (1) according to claim 1, wherein the primary light output face (3*b*) comprises light-scattering means (7) in order to scatter the light input by the lighting means (2) around the main emission direction (4) as it exits the primary light output face (3*b*).

6. The illumination device (1) according to claim 1, wherein the secondary optic element (5) is in the form of a transparent solid body.

7. The illumination device (1) according to claim 1, wherein the primary optic element (3) is in the form of a transparent solid body.

8. The illumination device (1) according to claim 1, wherein the secondary light input face (5*a*) and the secondary light output face (5*b*) are curved.

9. The illumination device (1) according to claim 1, wherein the light source support (8) comprises a printed circuit board.

10. The illumination device (1) according to claim 9, wherein the light sources (9) are distributed at uniform distances over the entire light source path.

11. The illumination device (1) according to claim 1, wherein a screen (13) is arranged between the primary optic element (3) and the secondary optic element (5).

12. A motor vehicle headlight having an illumination device (1) according to claim 1.

13. The illumination device (1) according to claim 1, wherein the spatial extent is more than 15 mm.

14. The illumination device (1) according to claim 2, wherein the optical elements are arranged together in a uniform grid on the secondary light input face.

15. The illumination device (1) according to claim 1, wherein the distance between the primary optic element (3) and the secondary optic element (5) is 2 mm.

16. The illumination device (1) according to claim 8, wherein there is a substantially constant normal distance between the secondary light input face (5*a*) and the secondary light output face (5*b*), starting from the secondary light output face (5*b*).

17. The illumination device (1) according to claim 1, wherein the lighting means (2) is arranged relative to the primary light input face (3*a*) such that the light is emitted from the lighting means (2) into the primary optic element (3) in a direction orthogonal to the main emission direction (4).

* * * * *